2,912,404

SOLUTIONS OF MODIFIED POLYESTERS IN THIOPHENOLS

Paul R. Cox, Jr., Decatur, Ala., assignor to The Chemstrand Corporation, Decatur, Ala., a corporation of Delaware No Drawing. Application November 25, 1957
Serial No. 698,358

15 Claims. (Cl. 260—30.8)

This invention relates to solutions of high molecular weight modified polyesters dissolved in thiophenols.

Filaments of high molecular weight polyesters are normally produced by melt spinning. Melt spinning however has a number of disadvantages and the art has attempted to employ dry spinning and wet spinning processes for producing polyester filaments. For both these latter two methods, solutions of the polyester are required and a lack of suitable polyester solvents has impeded progress in this art.

Accordingly it is one of the objects of this invention to provide solutions of certain modified polyester compositions which may be employed in wet and dry spinning processes for producing polyester filaments. It is another object of this invention to provide solutions of modified polyester which are stable, have the necessary viscosity for both dry and wet spinning operations and which do not have gelling tendencies. It is a further object of this invention to prepare and provide polyester solutions or dopes which are readily transformed into shaped articles. Other objects and advantages of the invention will be apparent from the following description.

The objects of this invention are realized by providing solutions of hereinafter defined modified polyesters in a thiophenol. It was quite unexpected that the modified polyesters would dissolve in thiophenols since unmodified polyesters such as polyethylene terephthalate are insoluble in thiophenols. Any of the thiophenols are useful in the practice of this invention including thiophenol itself, 3-hydroxythiophenol, 3-methoxythiophenol, 2-hydroxythiophenol, 2-ethoxythiophenol, m-thiocresol, 2-chlorothiophenol, 3-aminothiophenol, o-aminobenzenethiol, 1,3-dithiobenzene and the like or mixtures thereof.

Solutions of the desired solids contents, viscosity and excellent stability are readily prepared by heating a mixture of the modified polyester and a thiophenol. In preparing these solutions the polyester and thiophenol may be heated together, the polyester may be added to the heated thiophenol, the polyester and a portion of the thiophenol which will be employed to make the desired solution are heated together and the remainder of the thiophenol added later, or any other desired modification or variation. The temperature at which the solution is made may be varied as will be understood by those skilled in the art depending to some degree upon the nature of the modified polyester, the thiophenol employed, and the solids concentrations desired in the solution. For example, a modified polyester such as that described in Example II hereinafter is readily dissolved in a concentration of 5 percent solids in thiophenol at 100° C. The same polyester is dissolved in 5 percent solids concentrations in o-aminobenzenethiol at 70–75° C. Usually the temperature employed to make the solutions will be varied from about 75° C. to about 200° C., and more preferably from about 100° C. to about 175° C. At temperatures above the boiling point of the solvent, pressure equipment of course must be employed. It is apparent that while dissolution of the modified polyesters in solvent may be accomplished at lower temperatures, the polyesters will enter into the solution more rapidly and at higher solids concentrations at the higher temperatures. Although stirring is not necessary to effect solution it is preferred that stirring be employed.

The solids concentration of modified polyesters in solution may be varied as desired and is dependent to some degree on the factors discussed above. Ordinarily, solutions of about 1 to about 40 weight percent of modified polyester are contemplated.

In the manufacture of filaments and fibers, polyesters having molecular weights of at least about 10,000 are normally employed. Lower molecular weight polyesters may be used when the solutions are to be employed for coatings or as impregnants.

The modified polyesters of this invention are described more fully in a copending application of William A. H. Huffman Serial No. 682,272, filed September 6, 1957, and are prepared by reacting modifying amounts of dialkyl esters of saturated dicarboxylic aliphatic acids containing 20 carbon atoms with a glycol and an aromatic dicarboxylic acid or ester thereof to produce high molecular weight fiber-forming polyesters having increased dye affinity and a useful balance of desirable physical properties.

The dialkyl esters of saturated aliphatic dicarboxylic acids containing 20 carbon atoms have the general formula

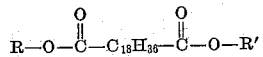

wherein R and R' are alkyl radicals. More preferably the dialkyl esters are of the general formula

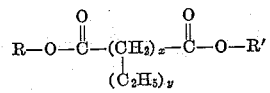

wherein R and R' are alkyl radicals containing from 1 to 10 carbon atoms, and more preferably are alkyl hydrocarbon radicals containing from 1 to 5 carbon atoms including methyl, ethyl, propyl, isopropyl, n-butyl, sec. butyl, isobutyl, n-amyl, isoamyl and the like; $x$ is an integer from 14 to 18, $y$ is an integer from 0 to 2, and $x+y=18$. R and R' may be the same or may be different alkyl radicals. Representative dialkyl esters found useful include dialkyl 1,20-eicosane dioate, dialkyl 8-ethyl octadecane-1, 18-dioate, dialkyl diethylhexadecane-1,16-dioate and the like, wherein the dialkyl groups are methyl, ethyl, propyl and the like including alkyl hydrocarbon radicals containing from 1 to 5 carbon atoms. Mixtures of any of the materials described above may also be used. For examples, mixtures of about 20 to 80 weight percent of dimethyl 1,20-eicosane dioate and about 80 to 20 weight percent of dimethyl 8-ethyl-octadecane-1,18-dioate are quite useful.

The glycols employed in the preparation of the modified polyesters may be any glycol containing from 2 to 10 carbon atoms and more preferably are polymethylene glycols of the general formula

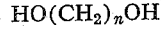

wherein $n$ is an integer from 2 to 10 and preferably 2 to 6. Ethylene glycol is found particularly useful in preparing the modified polyesters of this invention. At least about one molar proportion of the glycol per molar proportion of the dimethyl terephthalate and dialkyl ester of a $C_{20}$ acid is employed. Generally, however, higher proportions of the glycol relative to the esters or acids are used. For example, up to ten mols of glycol per mol of dibasic acids or esters are often employed because the initial reaction takes place more readily in the presence of an excess of glycol.

The dibasic dicarboxylic acids may be any of those employed by those skilled in the art to make fiber-forming polyesters but more preferably are aromatic dibasic dicarboxylic acids such as p,p'-dicarboxy diphenyl, naphthalene dicarboxylic acids such as 2,6-dicarboxynaphthalene, p,p'-dicarboxydiphenylsulfone, p,p'-dicarboxydiphenylethane, terephthalic acid, isophthalic acid and the like, or dialkyl esters thereof. Of particular value in preparing modified polyesters is terephthalic acid and dialkyl esters thereof such as dimethyl terephthalate and similar dialkyl esters wherein the alkyl groups are the same or different alkyl radicals, preferably alkyl hydrocarbon radicals containing 1 to 5 carbon atoms. Isophthalic acid and its dialkyl esters also may be employed to make useful modified polyesters. Copolymers of two or more glycols and two or more dibasic carboxylic acids or esters thereof may also be similarly modified. Of particular utility as reactants is a mixture of dimethyl terephthalate, dimethyl isophthalate, ethylene glycol and dimethyl eicosane dioate.

The amounts of necessary reactants employed to make the modified polyesters, on a molar basis, are ordinarily one mol equivalent of a mixture of at least the above two types of dialkyl esters of aromatic and $C_{20}$ dicarboxylic acids and a molar excess of the glycol. In the mixtures of the dialkyl esters, the dialkyl aromatic dicarboxylic acid esters are present in amount from about 65 to 95 weight percent and the dialkyl esters of the aliphatic $C_{20}$ dicarboxylic acids are present in amount from about 35 to about 5 weight percent. Smaller amounts of the dialkyl esters of the $C_{20}$ acids, as about 5 to 20, result in polyesters having an excellent balance of physical properties.

A modified polyester for use in accordance with the present invention is produced from dimethyl terephthalate, dimethyl 1,20-eicosane dioate and ethylene glycol. To prepare such a polyester a reaction vessel is charged with necessary amounts of dimethyl terephthalate, dimethyl 1,20-eicosane dioate and an excess of ethylene glycol; and as a catalyst, manganous formate.

The mass is then heated under nitrogen for approximately 1 to 3 hours at a temperature in the range of about 175° C. to remove the methanol formed by the ester interchange reaction. Thereafter the temperature is raised to about 250° C. to remove the ethylene glycol and then the vessel is evacuated to less than about 1 mm. while the reaction mass is heated at a temperature in the range of about 280–300° C., and maintained at such temperature for about 3 hours. The resulting product is a fiber-forming cold-drawable polyester.

To further illustrate the present invention and the advantages thereof, the following specific examples are given, it being understood that these are merely intended to be illustrative. Unless otherwise indicated, all parts and percents are by weight.

*Example I*

In this example an unmodified polyethylene terephthalate was prepared to be employed as a control or standard for comparison with the modified polyesters. A mixture or charge of 41 grams of dimethyl terephthalate, 44 ml. of ethylene glycol and 20 mg. of manganous formate was placed in a reaction vessel fitted with a distilling column and heated under nitrogen atmosphere at approximately 178° C. for a period of 1½ hours. The methanol formed during the reaction was distilled out of the reaction vessel. After all the methanol was removed, the temperature of the reaction mixture was raised to 287° C. for a period of 30 minutes in order to remove by distillation the excess glycol in the vessel. The system was then placed under vacuum and the pressure reduced to less than 1 mm. mercury while maintaining the temperature at 287° C. The polymerization was allowed to proceed for approximately 3 hours during which time the ethylene glycol formed during the polymerization reaction was distilled off, to form a polymer in the fiber-forming range which was cold-drawable.

*Example II*

Following the general experimental procedure set forth in Example I, 57.4 grams of dimethyl terephthalate (70 weight percent of the total diester) 24.6 grams of dimethyl esters of a $C_{20}$ dicarboxylic acid (a mixture of 57 percent dimethyl 1,20-eicosane dioate and 43 percent dimethyl 8-ethyl octadecane-1,18-dioate, this mixture being 30 weight percent of the total diester), 60 milligrams of manganous formate and 88 ml. of ethylene glycol (an excess), were reacted together by heating at about 180° C. for 90 minutes until ester interchange was completed and the methanol removed, then at 250° C. to 290° C. to remove the excess ethylene glycol, and for three hours under high vacuum of less than 1 mm. at 287° C. A high molecular weight, fiber-forming cold-drawable polymer was obtained. A mixture of 5 percent of this modified polyester was readily and rapidly dissolved in thiophenol at 100° C. Clear and viscous solutions of (1) 20 percent solids of this modified polyester were readily made at 110–115° C., (2) 30 percent solids at 130° C. and (3) 35 percent solids at 140° C. These solutions were stable, had the required viscosity for spinning and were readily spinnable. Filaments produced by extruding the above heated solutions through a spinnerette into air at room temperature, which filaments are then washed with water and 10 percent aqueous sodium hydroxide solution and dried, have excellent tenacity and elongation and are readily dyed with dispersed acetate dyestuffs. Fibers also may be wet spun from the above solutions into water or water-alcohol mixtures. Films of modified polyester also are readily cast from the solutions of this example. The unmodified polyester of Example I was not soluble in thiophenol under these same experimental conditions even at 175° C. Useful solutions are also prepared from the other thiophenols listed hereinabove.

*Example III*

Following the general experimental procedure of Example II, a dimethyl terephthalate polyester modified with 20 percent of dimethyl esters of $C_{20}$ dicarboxylic acids as described in Example II was prepared. A five percent solids solution in thiophenol was prepared at 120° C.–125° C. The resulting solution was clear and viscous. Modified polyester fibers are readily dry spun from this solution and the fibers so produced have excellent physical properties and are readily dyed with dispersed acetate dyestuffs.

*Example IV*

Following the general experimental procedure set forth in Example II, dimethyl terephthalate polyesters modified with 10 percent of the mixed dimethyl esters of $C_{20}$ dicarboxylic acids as described in Example II was prepared. A 5 percent solution of this polyester in thiophenol was readily prepared at a temperature of 158° C. and the resulting solution was a clear viscous dope. A 15 percent solids solution was prepared at 165° C. with this modified polyester. Excellent filaments are readily spun from these solutions.

*Example V*

The modified polyester of Example II was readily dissolved at 70° C.–75° C. and 100° C. in o-aminobenzenethiol. Five and ten percent solids solutions are readily spun into useful fibers and filaments.

When the above examples are repeated with other dialkyl $C_{20}$ alkane dioates such as diethyl and dipropyl 1,20-eicosane dioates and 8-ethyl octadecane 1,18-dioates, with other dialkyl terephthalates such as diethyl terephthalate, other polymethylene glycols such as tetramethylene glycol and the like, and other thiophenols as described herein, similar useful solutions are obtained.

Likewise, useful solutions are readily prepared from mixtures of the thiophenols and other polyester solvents, which other polyester solvents alone may be poor solvents for the polyesters.

The novel polyester solutions of this invention in addition to their use in fiber-forming operations can also be used for coating and impregnating textile fabrics, paper and the like, as well as metals, glass, glass fibers and the like.

It is not the intention of the inventor that the invention be limited solely to the details of the embodiments set forth above as it will be recognized by the man skilled in the art that numerous and obvious modifications conforming to the spirit of the invention may be made and it is intended that the invention be limited solely by the scope of the appended claims.

I claim:

1. A composition comprising a thiophenol and a modified polyester comprising the reaction product of a mixture of (1) at least one compound selected from the group consisting of aromatic dicarboxylic acids and dialkyl esters of said acids wherein the alkyl radicals contain 1 to 5 carbon atoms, (2) a dialkyl ester of a saturated aliphatic dicarboxylic acid containing 20 carbon atoms of the general formula

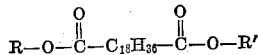

wherein R and R' are alkyl radicals containing from 1 to 10 carbon atoms, and (3) at least one glycol of the general formula $HO(CH_2)_nOH$, wherein $n$ is an integer from 2 to 10.

2. A composition comprising a thiophenol and a modified polyester comprising the reaction product of a dialkyl ester of terephthalic acid, wherein the alkyl radicals contain 1 to 5 carbon atoms, a dialkyl ester of the general formula

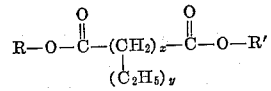

wherein R and R' are alkyl radicals containing from 1 to 10 carbon atoms, $x$ is an integer from 14 to 18, $y$ is an integer from 0 to 2, and $x+y=18$, and a glycol of the general formula $HO(CH_2)_nOH$, wherein $n$ is an integer from 2 to 10.

3. A composition comprising a thiophenol and the modified polyester of claim 2 wherein the dialkyl ester of terephthalic acid is present in amount from about 95 to 65 weight percent of the total dialkyl esters and the dialkyl ester of the formula

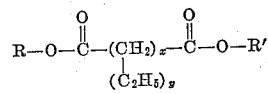

is present in amount from about 5 to about 35 weight percent of the total dialkyl esters.

4. A composition comprising a thiophenol and the modified polyester of claim 3 wherein the alkyl radicals of the dialkyl ester of terephthalic acid and R and R' of the dialkyl ester of the general formula

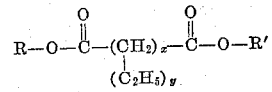

are alkyl hydrocarbon radicals containing 1 to 5 carbon atoms.

5. A composition comprising a solution of thiophenol and a modified polyester comprising the reaction product of dimethyl terephthalate, dimethyl 1,20-eicosane dioate and ethylene glycol.

6. A composition comprising a solution of o-aminobenzenethiol and a modified polyester comprising the reaction product of dimethyl terephthalate, dimethyl 1,20-eicosane dioate and ethylene glycol.

7. A composition comprising a solution of thiophenol and a modified polyester comprising the reaction product of (1) a mixture of 90 to 70 weight percent of dimethyl terephthalate and 10 to 30 weight percent of a dimethyl ester of the general formula

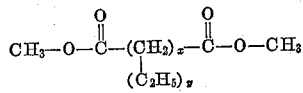

wherein $x$ is an integer from 14 to 18, $y$ is an integer from 0 to 2 and $x+y=18$, and (2) an excess of ethylene glycol.

8. A composition comprising a solution of o-aminobenzenethiol and a modified polyester comprising the reaction product of (1) a mixture of 90 to 70 weight percent of dimethyl terephthalate and 10 to 30 weight percent of a dimethyl ester of the general formula

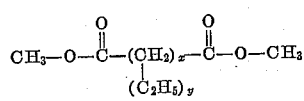

wherein $x$ is an integer from 14 to 18, $y$ is an integer from 0 to 2 and $x+y=18$, and (2) an excess of ethylene glycol.

9. A composition comprising a solution of thiophenol and a modified polyester comprising the reaction product of one mol equivalent of a mixture of 95 to 65 weight percent of dimethyl terephthalate and 5 to 35 weight percent of a mixture of dimethyl 1,20-eicosane dioate and dimethyl 8-ethyl octadecane-1,18-dioate, and a molar excess of ethylene glycol.

10. A composition comprising a solution of o-aminobenzenethiol and a modified polyester comprising the reaction product of one mol equivalent of a mixture of 95 to 65 weight percent of dimethyl terephthalate and 5 to 35 weight percent of a mixture of dimethyl 1,20-eicosane dioate and dimethyl 8-ethyl octadecane-1,18-dioate, and a molar excess of ethylene glycol.

11. A composition comprising a solution of thiophenol and a modified polyester comprising the reaction product of a mixture 95 to 80 weight percent of dimethyl terephthalate and 5 to 20 weight percent of a mixture of about 60 weight percent dimethyl 1,20-eicosane dioate and about 40 weight percent dimethyl 8-ethyl octadecane-1,18-dioate, with a molar excess of ethylene glycol.

12. A composition comprising a solution of o-aminobenzenethiol and a modified polyester comprising the reaction product of a mixture 95 to 80 weight percent of dimethyl terephthalate and 5 to 20 weight percent of a mixture of about 60 weight percent dimethyl 1,20-eicosane dioate and about 40 weight percent dimethyl 8-ethyl octadecane-1,18-dioate, with a molar excess of ethylene glycol.

13. A composition comprising a solution of thiophenol and a modified polyester comprising the reaction product of one molar equivalent of a mixture of about 90 to 70 weight percent dimethyl terephthalate and 10 to 30 weight percent of a mixture of about 20 weight percent dimethyl 1,20-eicosane dioate and about 80 to 20 weight percent of dimethyl 8-ethyl octadecane-1,18-dioate, and a molar excess of ethylene glycol.

14. A composition comprising a solution of o-aminobenzenethiol and a modified polyester comprising the reaction product of one molar equivalent of a mixture of about 90 to 70 weight percent dimethyl terephthalate and 10 to 30 weight percent of a mixture of about 20 to 80 weight percent dimethyl 1,20-eicosane dioate and about 80 to 20 weight percent of dimethyl 8-ethyl octadecane-1,18-dioate, and a molar excess of ethylene glycol.

15. A method for preparing a composition comprising dissolving a modified polyester which comprises the reaction product of a mixture of (1) at least one compound selected from the group consisting of aromatic dicarboxylic acids and dialkyl esters of said acids, wherein the alkyl radicals contain 1 to 5 carbon atoms, (2) a dialkyl ester of a saturated aliphatic dicarboxylic acid containing 20 carbon atoms of the general formula $$R-O-\overset{O}{\underset{\|}{C}}-C_{18}H_{36}-\overset{O}{\underset{\|}{C}}-O-R'$$

wherein R and R' are alkyl radicals containing from 1 to 10 carbon atoms, and (3) at least one glycol of the general formula $HO(CH_2)_nOH$, wherein $n$ is an integer from 2 to 10, in a thiophenol.

No references cited.

UNITED STATES PATENT OFFICE
CERTIFICATE OF CORRECTION

Patent No. 2,912,404

November 10, 1959

Paul R. Cox, Jr.

It is hereby certified that error appears in the printed specification of the above numbered patent requiring correction and that the said Letters Patent should read as corrected below.

Column 6, line 67, for "about 20 weight" read -- about 20 to 80 weight --.

Signed and sealed this 3rd day of May 1960.

(SEAL)
Attest:

KARL H. AXLINE
Attesting Officer

ROBERT C. WATSON
Commissioner of Patents